April 24, 1962    J. M. LEACH    3,031,066
SWINGING TRAY CONVEYORS
Filed Jan. 29, 1959    2 Sheets-Sheet 1
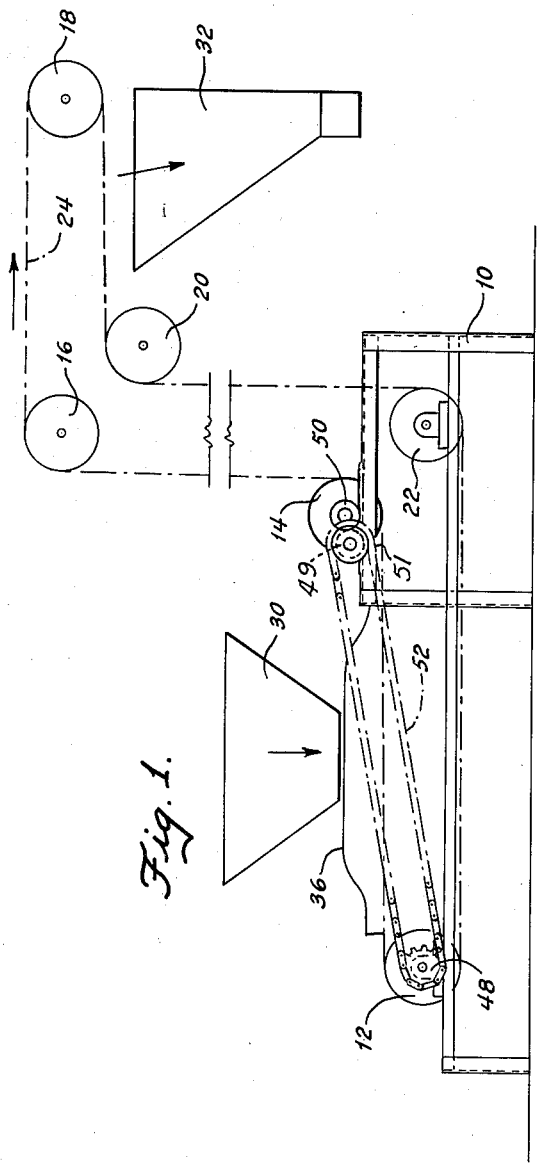
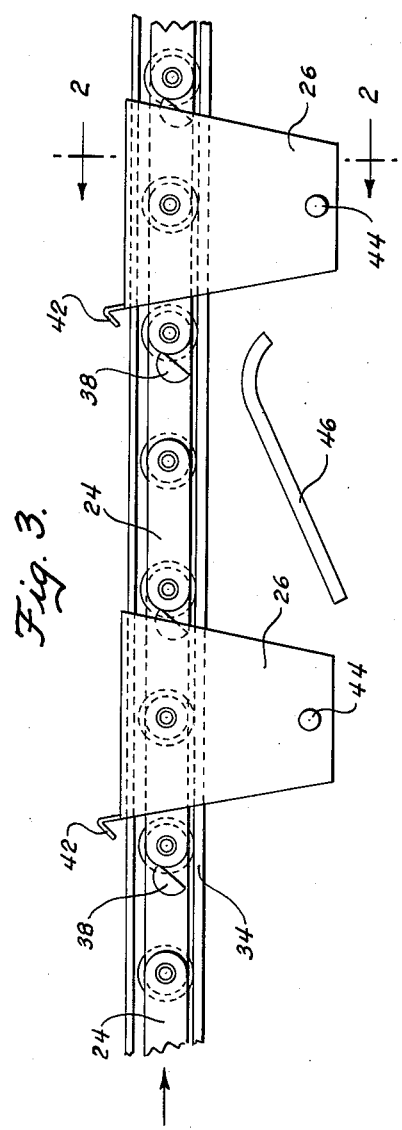
INVENTOR.
John M. Leach April 24, 1962
J. M. LEACH
3,031,066
SWINGING TRAY CONVEYORS
Filed Jan. 29, 1959
2 Sheets-Sheet 2
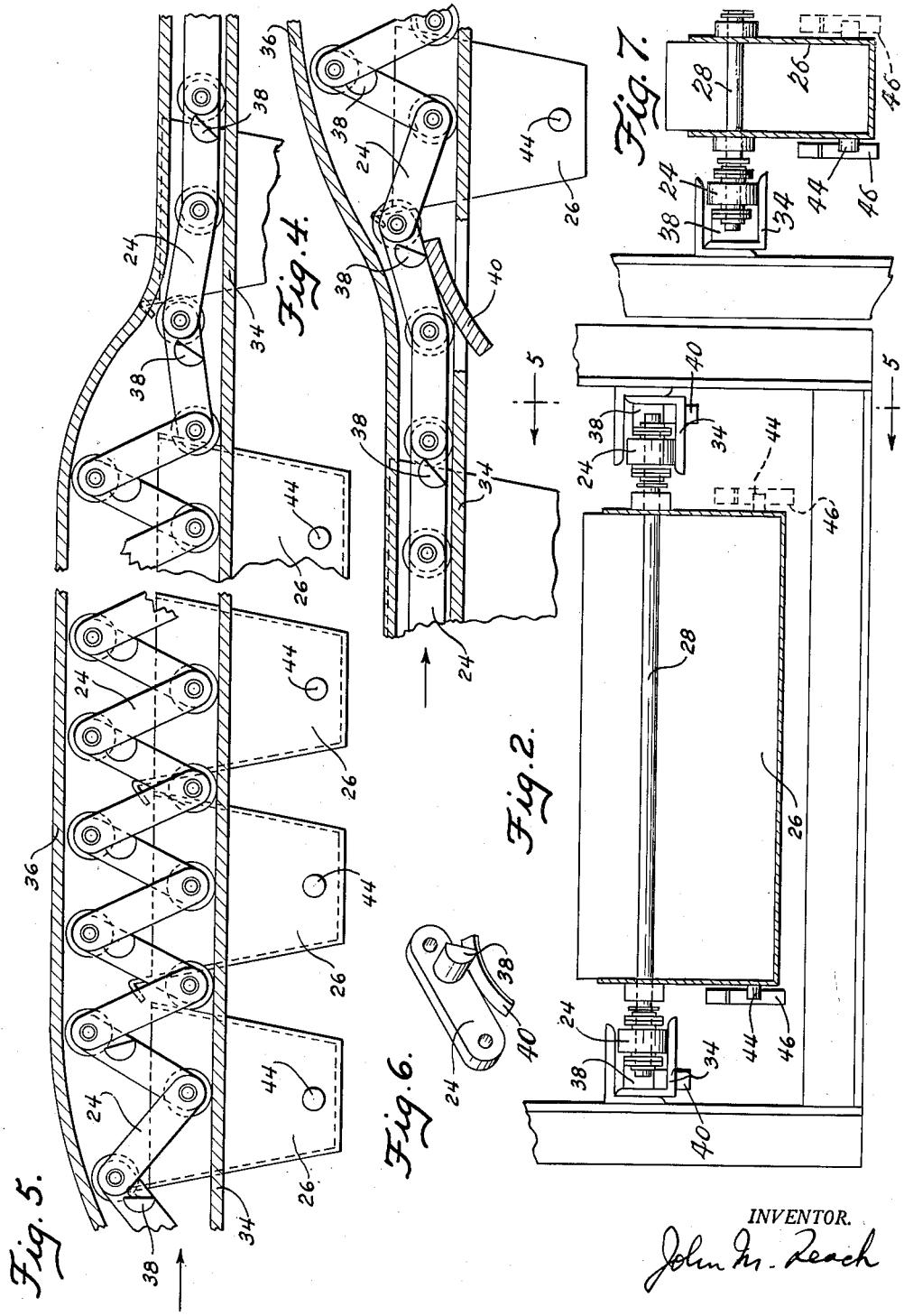
INVENTOR.
John M. Leach United States Patent Office 3,031,066
Patented Apr. 24, 1962

3,031,066
SWINGING TRAY CONVEYORS
John M. Leach, 17 Monfort Road, Port Washington, N.Y.
Filed Jan. 29, 1959, Ser. No. 789,961
10 Claims. (Cl. 198—140)

The present invention relates to conveyors. More particularly, it relates to conveyors of the type used for moving materials in carriers preferably in the form of containers such as trays or buckets.

An object of the present invention is to provide a conveyor provided with containers carried between two parallel flexible elements with the containers spaced apart on the flexible elements to enable them to pivot and thus retain their horizontal position while going around turns and with an arrangement whereby the containers can be moved into solid or contacting positions at a load point so as to enable material to be dumped directly into them without spilling between the containers and again move apart when they leave the loading area.

It is a further object of the present invention to provide a conveying mechanism which is simple in nature and fool proof in operation.

Other objects and advantages, if not specifically pointed out, will be apparent to those skilled in the art as a detailed description of the invention proceeds.

For a more detailed description of the invention, reference is made to the accompanying drawing wherein like reference characters refer to the same elements throughout, and in which:

FIGURE 1 is a diagrammatic side elevation of a conveyor of the present invention;

FIGURE 2 is a cross sectional view of a container of the present invention in the form of a tray or bucket showing a method of attaching it to the flexible side elements and taken on a plane indicated by line 2—2 of FIGURE 3;

FIGURE 3 is a fragmentary side view of one of the flexible elements showing the relative positioning of the containers thereon;

FIGURE 4 is an enlarged fragmentary sectional view of a conveyor of the present invention with the enclosure section cut away to show the action of the flexible elements;

FIGURE 5 is a continuation view of FIG. 4 to show further action of the flexible elements;

FIGURE 6 is a detailed view of a link of one of the flexible elements showing the position of a cam follower; and FIGURE 7 is a cross sectional view of a container of small size carried by a single chain.

The improvement of the present invention, for the purpose of illustration, will be shown in connection with an elevating type of conveyor which is normally used to convey relatively fragile materials from one elevation to another. It is to be understood that the improvement can be embodied in a conveyor for transferring materials from one point to another on the same level or at a lower level or any combination of up and down and straight runs desired.

Referring to FIGURE 1; the conveyor of the present invention consists of any suitable supporting frame work 10 which supports pairs of sprockets 12, 14, 16, 18, 20 and 22. These pairs of sprockets are suitably supported in any desired type of bearings on the frame structure and coact with flexible elements which for the purpose of illustration will be shown as two roller chains 24 formed of links connected together by pins. These chains are each passed over the sprockets of one side of the pairs to form an endless path. This path in FIG. 1 is shown as following a horizontal path, then turning under sprockets 14 and running upwardly for any desired distance; then turning over sprockets 16 to the horizontal for any desired distance, then being reversed by sprockets 18 back to a point near its other vertical run; and then turning over sprockets 20 and running downwardly until it passes under sprockets 22 and follows a horizontal path to a point where it is again reversed 180 degrees by sprockets 12 to repeat the path.

Carriers which may be in the form of buckets or trays 26 are suspended between the chains 24 at any desired intervals but for the purpose of illustration have been shown as being attached at every 4th pitch of the chain. Depending upon the size of the bucket relative to the pitch of the chain, the buckets in this modification may be attached to every 2nd, 4th, 6th, 8th or any desired even number of pitches.

The buckets are suspended from the chain in any desired manner; for example, as being pivoted on rods 28 which are connected to the chains 24 in any suitable manner so that the buckets 26 can pivot on the rods 28 and always retain their horizontal position except at the unload points where they are dumped by any suitable dumping mechanism such; for example, as studs 44 on the buckets which coact with a fixed cam 46 suitably carried by the frame.

In the diagrammatic illustration shown in FIG. 1 the buckets 26 can be automatically loaded with any desired material suitably discharged from any suitable source such as a hopper or bin 30. The material received into the buckets from the hopper 30 is carried up and around and discharged into a receiving hopper 32 which feeds the material to any desired destination.

The chains 24 are suitably driven by driving any desired pair of sprockets by any suitable prime mover such as an electric motor (not shown).

As shown in FIGURE 3, the buckets 26 are positioned sufficiently far apart so that they will not contact with each other during their passage around the turns formed by the sprockets. This means that the buckets will not be objectionably tilted to dislodge material at undesired points; and the buckets will always remain horizontal except at any desired dumping point or points such as the bin 32. Several dumping points may be provided, if desired, by placing the studs 44 at different positions or on alternate sides of the buckets and placing cams 46 at different points to coact only with cams on selected buckets. In this manner; one conveyor can be caused to serve several different receiving hoppers or machines or to spread material over a large area in a large bin or other receiver.

If the buckets 26 were to be permitted to remain in spaced apart relationship under a receiving area such as the bin 30 it would be necessary to provide the bin 30 with automatically controlled valve mechanism to cut-off the flow of material from bin 30 when no bucket is under the receiving point. Such mechanism is both expensive and unreliable and the need for it has been dispensed with by the present invention in the following manner: The supporting tracks for the chains 24 are shown as being channels 34 with the top portion of each channel elevated within the loading area as shown at 36. Every 2nd link of the chain 24 is provided with a cam follower 38 as shown in detail in FIG. 6. This cam follower 38 is so positioned on its respective chain link as to be cammed upwardly by a fixed cam 40 suitably connected to the frame as shown in FIG. 4 and cause the linkage connection nearest to it to be forced up into the space formed by the raised track section 36 and thereby produce a folding of the chain. The cam follower 38 is shaped as shown in FIG. 4 so that it contacts the link preceding the link to which it is attached at a point in the upper travel of the nearest linkage connection so as to prevent further folding of the chain linkages. This enables the chain to take the semi-folded form shown in FIG. 5 without causing a jamming action between the lower member of the track and the upper member 36. Also, as the cam follower 38 is moved upwardly by the cam 40 as shown in FIG. 4 a down pressure is placed against the linkage connection immediately following the cam follower 38 to insure that this connection does not move upwardly but remains at the lower part of the track 34 so as to insure that the chain links always take the semi-folded position shown in FIG. 5. It can be seen that this positive folding action of the chain linkages is performed deliberately with a minimum wearing of parts and in a dependable manner.

Because the buckets 26 are connected to linkage connections which do not move upwardly the buckets are caused to move together from the position shown in FIG. 3 to the position shown in FIG. 5.

Each bucket 26 is preferably formed with a lip 42 which extends over the bucket next to it and thus prevents any material from falling down between any minor crack or space which might exist between the buckets. This lip is preferably shaped with a upwardly sloped side and a downwardly sloped side so that any material which contacts the lip will be projected into one bucket or the other and will not remain on the lip and possibly be dislodged at some undesirable point.

If desired, the buckets 26 can be connected to the linkage connections which always move upwardly as shown in FIG. 4 and in this manner the buckets will be moved together at an elevated position from that shown in FIG. 5. Also, the buckets can be connected at the end of odd links, such as with 3 chain links between them; which will cause one bucket to remain in a low position as shown in FIG. 5 and the next bucket to be moved into a raised position so that half of the buckets are up and half of the buckets are down and they will still be moved together. This arrangement is desirable when wide buckets are required which would cause them to be jammed too close together if all remained on the same level. It is to be understood that the buckets may be given many different shapes depending on the type and quantity of materials to be handled.

In order to facilitate the folding and opening action of the chains, the shaft which carries sprockets 12 may be provided with a sprocket 48 which may be connected by a drive chain 52 with an identical sprocket 51 suitably mounted for rotation with a spur gear 49 which meshes with an identical spur gear 50 on the shaft which carries sprockets 14.

In the operation of the conveyor of the present invention, any desired material, such, for example, as fragile articles such as candy, lump or nodular chemicals, bakery goods, small delicate electronic or mechanical assemblies, etc., can be loaded from any desired source by gently dropping them into buckets in the position shown in FIG. 5 and the material will be carried to any desired point and gently discharged by merely dumping the bucket.

When the size of the carrier and the load permit, the carrier 26 may be suspended from only one chain as shown in FIGURE 7.

It can be seen that the conveyor of the present invention enables any material to be handled gently without requiring any vibratory or other automatic type of feeder for the loading operation and can be discharged directly into any simple receiver without requiring any chute, so that the material which is being handled is subjected to the least possible jarring forces during its travel. Also, the buckets can negotiate sharp turns without touching or being accidentally discharged and are never inverted except at the discharge point so that there is no undesirable spillage of any material from the buckets at any turn point.

All of the above can be accomplished by utilizing standard roller chain with a very simple cam follower attachment 38 which greatly reduces the cost of manufacture of this conveyor.

The foregoing description is intended merely as an embodiment of the present invention and many changes and modifications can be made in the physical structure without departing from the spirit of the invention; the scope of which is set forth in the appended claims.

I claim:

1. A conveyor comprising a pair of spaced apart movable chains having links connected together by pins, buckets pivotally connected at the pins to and between the chains at intervals which provide spaces between the buckets, a cam follower carried between the pins and to the side by every other link only of at least one of the chains, a cam in position to be contacted by the cam followers upon movement of the chain to move each cam follower so as to cause the link which carries it and the next link to move together in a folding action to thereby draw adjacent buckets closer together, and a surface on each cam follower which in the folded position of the links contacts a side of the link next to the link which carries it to prevent further folding action on the part of the links.

2. A conveyor comprising a pair of spaced apart movable chains having links connected together by pins, carriers connected to and between the chains at intervals which provide spaces between the carriers, a cam follower carried by every other link of at least one of the chains, a cam in position to be contacted by the cam followers upon movement of the chain to move each cam follower so as to cause the pin connection between the chain links which is nearest to the cam follower to move vertically and thus cause the links which that pin connects to move together in a folding action to thereby draw adjacent carriers closer together, and a surface on each cam follower which in the folded position of the links contacts a side of the link next to the link which carries it to prevent further folding action on the part of the links.

3. A conveyor comprising a pair of spaced apart movable chains having links connected together by pins, carriers connected to and between the chains at intervals which provide spaces between the carriers, cam followers carried by the links near but not at one of the pins, a cam in position to be contacted by the cam followers upon movement of the chains to move each cam follower so as to cause the pin connection which is nearest to the cam follower to move vertically and fold the links which that pin connects together and draw adjacent carriers nearest to that pin connection close together.

4. A conveyor comprising a pair of spaced apart movable chains having links connected together by pins, carriers connected to and between the chains at intervals which provide spaces between the carriers, cam followers carried by the links near but not at one of the pins, a cam in position to be contacted by the cam followers upon movement of the chains to move each cam follower so as to cause the pin connection which is nearest to the cam follower to move vertically and fold the links which that pin connects together and draw adjacent carriers nearest to that pin connection closer together, and a surface on each cam follower which in the folded position of the links contacts a side of the link next to the link which carries it to prevent further folding action of the links.

5. A conveyor comprising a movable chain having links connected together by pins, carriers connected to the chain at intervals which provide spaces between the carriers, a cam follower carried by every other link, a cam in position to be contacted by the cam followers upon movement of the chain to move each cam follower so as to move the pin connection nearest to it vertically and fold the links which it connects together and move the adjacent carriers closer together, and a surface on one of each folded pair of links which contacts a surface on the other link of the pair to limit the folding action between the links of the pair.

6. A conveyor comprising a pair of spaced apart movable chains having links connected together by pins, buckets pivotally connected to and between the chains at intervals which provide spaces between the buckets, a cam follower carried by every other link and projecting away from one side thereof parallel to the pins, a cam in position to be contacted by the cam followers upon movement of the chain to move the cam follower and the link which carries it so as to cause that link and the link next to it to fold together until the link next to it contacts the cam follower and thus limits the folding action which caused adjacent buckets to move closer together.

7. A conveyor comprising a pair of spaced apart movable chains having links connected together by pins, carriers connected to and between the chains at intervals which provide spaces between the carriers, a drive to push the chains along, guides to prevent folding of the chains in a given area, a cam follower carried by every other link of at least one of the chains adjacent to a pin, a cam in position to be contacted by each cam follower just as the cam follower leaves the given guided area of the chain so as to vertically move the pin adjacent the cam follower and initiate folding action of the links, which folding action is continued by the pushing force of the chain so as to reduce wear between the cam and cam follower.

8. A conveyor comprising a pair of spaced apart movable chains having links connected together by pins, carriers connected to and between the chains at intervals which provide spaces between the carriers, a drive to push the chain along, guides to prevent folding of the chains in a given area, a cam follower carried by every other link of at least one of the chains adjacent to a pin, a cam in position to be contacted by each cam follower just as the cam follower leaves the given guided area of the chain so as to vertically move the pin adjacent the cam follower and initiate a folding action of the links, which folding action is continued by the pushing force of the chain so as to reduce wear between the cam and cam follower, the pushing action of the chain also being thereby caused to force the end of the link opposite from the end carrying the cam downwardly to prevent any tendency of that end of the link to move upwardly, the carriers thereby being drawn together.

9. A conveyor comprising a movable chain having links connected together by pins, carriers connected to the chain at intervals which provide spaces between the carriers, a drive to push the chain along, guides to prevent folding of the chain in a given area, a cam follower carried by every other link of the chain adjacent to a pin, a cam in position to be contacted by each cam follower just as the cam follower leaves the given guided area of the chain so as to vertically move the pin adjacent the cam follower and initiate a folding action of the links, which folding action is continued by the pushing force of the chain so as to reduce wear between the cam and cam follower.

10. A conveyor comprising a movable chain having links connected together by pins, carriers connected to the chain at intervals which provide spaces between the carriers, a drive to push the chain along, guides to prevent folding of the chain in a given area, a cam follower carried by every other link of the chain adjacent to a pin, a cam in position to be contacted by each cam follower just as the cam follower leaves the given guided area of the chain so as to vertically move the pin adjacent the cam follower and initiate a folding action of the links, which folding action is continued by the pushing force of the chain so as to reduce wear between the cam and cam follower, the pushing action of the chain also being thereby caused to force the end of the link opposite from the end carrying the cam follower downwardly to prevent any tendency of that end of the link to move upwardly.

References Cited in the file of this patent

UNITED STATES PATENTS

| | | |
|---|---|---|
| 1,557,368 | Kershaw et al. | Oct. 13, 1925 |
| 2,487,354 | McNamara et al. | Nov. 8, 1949 |
| 2,534,054 | Parkes | Dec. 12, 1950 |
| 2,780,342 | Good | Feb. 5, 1957 |